Dec. 15, 1970   R. H. CLAAR   3,546,853
COVERING AND FILTERING APPARATUS FOR FUEL TANKS
Filed Aug. 9, 1968   2 Sheets-Sheet 1
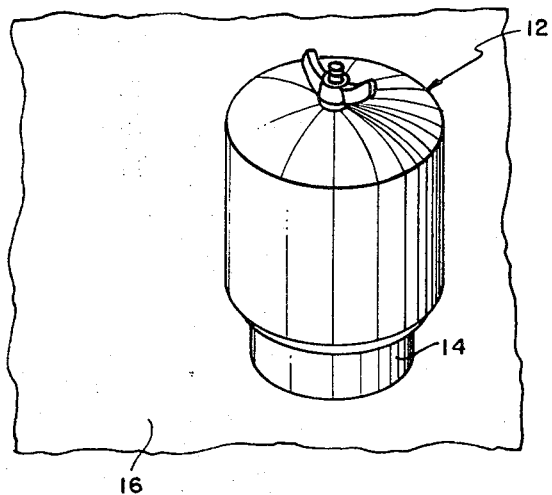
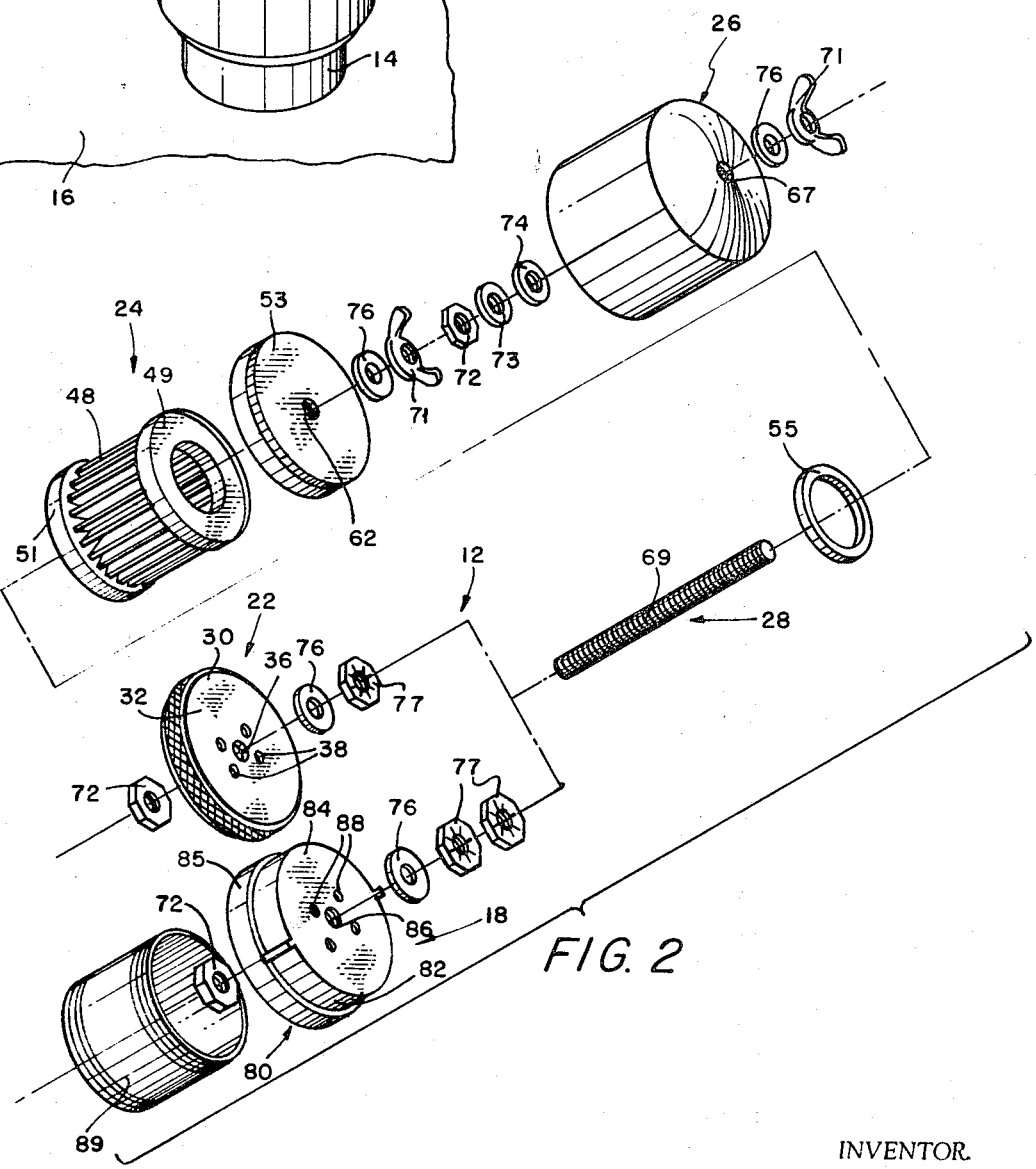
INVENTOR.
RALPH H. CLAAR
BY
*Phillip A. Rein*
ATTORNEY Dec. 15, 1970   R. H. CLAAR   3,546,853
COVERING AND FILTERING APPARATUS FOR FUEL TANKS
Filed Aug. 9, 1968   2 Sheets-Sheet 2

INVENTOR.
RALPH H. CLAAR
BY
*Phillip A. Zein*
ATTORNEY

United States Patent Office 3,546,853
Patented Dec. 15, 1970

3,546,853
COVERING AND FILTERING APPARATUS
FOR FUEL TANKS
Ralph H. Claar, P.O. Box 99, Deerfield, Kans. 67838
Filed Aug. 9, 1968, Ser. No. 751,469
Int. Cl. B01d 27/08; B65d 51/16
U.S. Cl. 55—419                                    2 Claims

ABSTRACT OF THE DISCLOSURE

This invention relates to covering and filtering apparatue operable to be connected to a standard internal combustion engine type fuel tank or to a stem pipe in a reservoir tank and may be constructed so as to be an integral, throw-away type unit readily replaceable at low cost. More particularly, this invention is a covering and filtering apparatus including an attachment means connectable to a fuel reservoir; a filtering means mounted on the attachment means operable to cleanse a fluid medium on its passage therethrough; a cover means mountable about the filtering means to direct air through inlet openings and prevent the filtering means from becoming contaminated merely by debris flowing thereby; and connecting means operable to releasably connect the cover means and filtering means to the attachment means whereupon the same can be easily taken apart for observance and or replacement.

---

Numerous types of filtering devices are known to the prior art attachable to carburetors, filter pipes for oil reservoirs, and the like operable to filter the air medium passing thereto. The prior art devices are operable to present a filtering body or element intermediate the inflowing air and the oil or fuel reservoir in order to remove the impurities from the air moving thereto. However, the prior art devices are generally bulky in size, expensive to manufacture, and are not readily usable for fuel reservoirs. The prior art devices are not satisfactory for use in high dust conditions such as found on farm implement earth working applications. Additionally, the prior art devices are not operable to provide a sealing device to prevent the loss of fuel therefrom but permitting a required amount of input air thereto.

It is noted that there are many problems created in the use of diesel engines on large farm tractor equipment whereupon, due to the high horsepower and large volume of fuel used, the fuel cap structure mounted upon the reservoir tank readily becomes clogged with dirt, impurities, and the like. As the fuel tanks are emptied during usage, the conventional fuel cap becomes clogged and does not allow any air to pass therethrough whereupon a vacuum is created within the reservoir tank and sometimes, very expensive tanks are ruptured or bent badly under the vacuum created therein. Therefore, it is of extreme importance in an earth working piece of equipment that air be permitted to enter into the reservoir tank at all times to prevent the same from collapsing. Additionally, the air going thereto must not contain any dust or impurities as such would readily clog up the fuel injection nozzles and other elements throughout the system. This invention relates to a covering and filtering apparatus operable to permit limited air flow to the reservoir tank while presenting a neat, compact structure therefore.

In preferred specific embodiments of this invention, a covering and filtering apparatus is provided (1) attachable to a conventional fuel tank stem in a twisting action, or (2) connectable to an upright threaded pipe stem found on storage tanks and the like. Additionally, the apparatus may be constructed as an integral, low cost, disposable covering and filtering apparatus which may be readily replaced as required by throwing away the entire unit. The covering and filtering apparatus includes an attachment means connectable to a threaded pipe or an inlet stem on a reservoir tank; a filtering means mountable against the attachment means in a sealed relationship; a cover means mountable over and about the filtering means to direct air flow adjacent a lower periphery thereof; and a connecting means operable to interconnect the attachment means, filtering means, and covering means into one sturdy, compact unit. In one embodiment, the attachment means includes a disc shaped fuel cap member operable on twisting to attach to a conventional fuel input stem having a main housing with a lower surface provided with laterally extended tabs for connection to the stem. Additionally, the attachment means includes a splash chamber formed in the interior thereof filled with a fiberous material such as steel wool. The upper surface of the main housing is provided with a plurality of openings adjacent a central connector opening and a lower portion of the housing on the other side of the steel wool is provided with a plurality of radially spaced holes to permit air flow into the reservoir tank. The filtering means includes a main upright, pleated main filter body having top and bottom surfaces closed by end plates to provide a substantially cylindrical filtering structure having its lower surface adapted to contact the upper surface of the main housing and provided with sealing ring therebetween. The filtering means further includes a cup member to engage the upper end plate in a sealing relationship whereas the air flow is directed through the filter body between the upper and lower end plates. The cover means is a generally cup-shaped structure adapted to be placed over and about the filtering means to direct air flow in a proper direction about the attachment means for movement transversely of the main filter body. The connecting means includes an elongated threaded shaft member having its lower end secured as by anchor or nut members to the main housing of the attachment means and extended upwardly through the center of the filtering means. A wing nut is placed upon the threaded shaft against the upper surface of the cup member to provide for a sealing relationship therewith against the upper surface filter body. The upper end of the threaded shaft receives adjacent nut members and a wing member placed on opposite sides of the cup cover means to maintain the same in a sturdy, spaced relationship relative to the other elements of this combination. In another embodiment of this invention, the attachment means is a cap member having an upper surface provided with an opening to be attached by the anchor members to the upright threaded shaft. The cap member is provided with internal threads whereupon the same can be readily threaded upon the upright external threads of a fuel storage tank entrance pipe or stem. In the disposable cover and fuel apparatus, the same is a structure whereupon the attachment means, filtering means, and covering means are all interconnected in one integral unit. More particularly, the disposable cover and fuel apparatus includes an attachment means having a main body integral through an intermediate wall to upright side walls secured to a separator wall. The filter means includes a main filter body sandwiched between the separator wall and the outer surface of the cover means. The cover means is substantially cup-shaped having its lower edges formed with a laterally extended end wall and its innermost surface integral with the upright side walls. The end wall is provided with a plurality of spaced elongated air inlet openings to direct the air upwardly for transverse movement through the main filter body to move downwardly through an opening in the separator wall and openings in the attachment means into the reservoir tank. The inlet air openings are spaced downwardly from the attachment means so as to hinder the movement of impurities therethrough. The area between the intermediate wall and the separator wall forms what is called a splash chamber to prevent fuel from within the fuel reservoir tank from splashing and contaminating the main filter body.

One object of this invention is to provide a covering and filtering apparatus for reservoir tanks overcoming the above mentioned disadvantages of the prior art devices.

Another object of this invention is to provide a covering and filtering apparatus attachable to conventional automotive fuel tanks or stem pipes in reservoir tanks having an outer cover plate which is removably attached thereto to readily observe the condition of the filter body and, additionally, having the filter body releasably connected so as to be easily removed and replaced as required.

Still, one other object of this invention is to provide a disposable covering and filtering apparatus for fuel storage tanks or reservoirs that is readily connected thereto and can be frequently replaced due to its low cost of manufacture.

Still, one further object of this invention is to provide a covering and filtering apparatus provided with an attachment means having a splash chamber therein to prevent fluids from splashing out of the reservoir tank and contaminating the filtering elements therein for increased life and efficiency.

A still further object of this invention is to provide a covering and filtering apparatus for attachment to fuel reservoirs to provide the required inlet air that is compact and lightweight in construction, easy to use, generally low cost in construction, and efficient in filtering action.

Various other objects, advantages, and features of the invention will become apparant to those skilled in the art from the following discussion, taken in conjunction with the accompanying drawings, in which:

FIG. 1 is a perspective view of a covering and filtering apparatus of this invention as secured to a fuel reservoir tank on a diesel engine;

FIG. 2 is an exploded perspective view of a covering and filtering apparatus of this invention illustrating a selection of attachment means;

Figure 3:
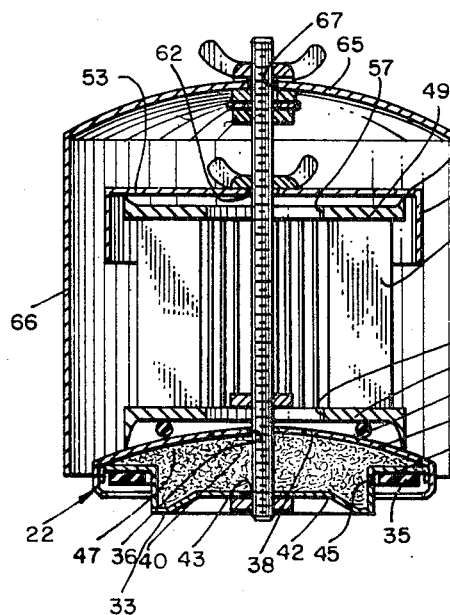
FIG. 3 is a sectional view illustrating a covering and filtering apparatus of this invention.

The following is a discussion and description of preferred specific embodiments of the new covering and filtering apparatus of this invention, such being made with reference to the drawings, whereupon the same reference numerals are used to indicate the same or similar parts and/or structure. It is to be understood that such discussion and description is not to unduly limit the scope of the invention.

Figure 5:
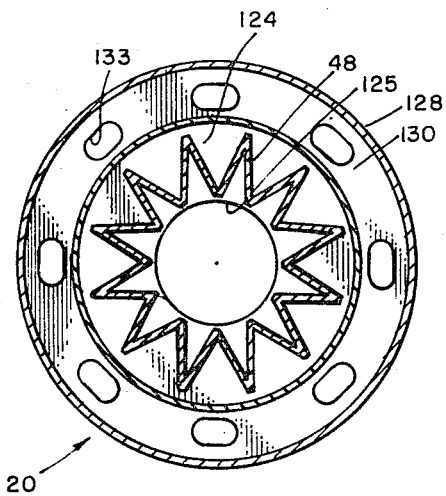
FIG. 5 is a sectional view taken along line 5—5 in FIG. 4.
Figure 6:
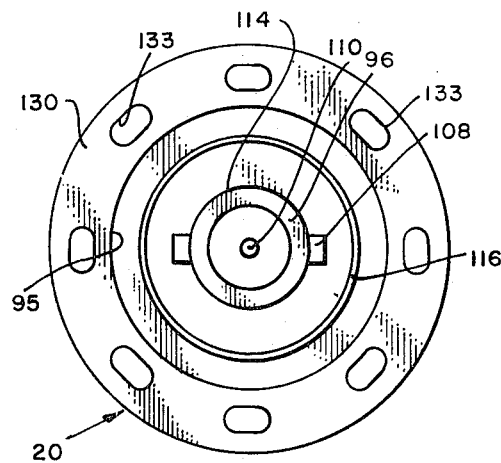
FIG. 6 is a bottom view of the disposable covering and filtering apparatus of this invention.

Referring to the drawings in detail and in particular to FIG. 1, a covering and filtering apparatus of this invention, indicated generally at 12, is shown attached to an upright outlet pipe or stem 14 of a fuel tank or reservoir 16. As shown in FIG. 2, the covering and filtering apparatus 12 includes another embodiment shown as a covering and filtering apparatus 18 having a different attachment means in the form of a cap member mounted thereon as will be explained. Additionally, this invention includes one other embodiment being a disposable covering and filtering apparatus 20 (FIGS. 4–6) which will be described in detail.

The covering and filtering apparatus 12 includes an attachment means 22; a filtering means 24 mountable against the attachment means 22; a cover means 26 mounted about the filtering means 24; and a connecting means 28 operable to releasably interconnect the attachment means 22, the filtering means 24, and the cover means 26.

As shown in FIGS. 2 and 3, the attachment means 22 is of generally disc or dome structure readily attachable to the fuel inlet stem 14 of automotive vehicles or the like in a one-half or three-quarter rotational action. More particularly, the attachment means 22 includes a main housing 30 having an upper curved wall 32 with the lower edges integral with a downwardly depending connector section 33. Intermediate the outer periphery of the upper wall 32 and the connector section 33 is placed a sealing gasket 35 engageable with the stem 14 when the same is attached thereto. The upper wall 32 of the housing 30 is provided with a central connector opening 36 and a plurality of radially spaced openings 38 thereabout to provide air to flow into an inner splash chamber 40. The connector section 33 is formed with a bottom wall 42 having also a connector opening 43 and upright side walls formed with discharge holes 45 for movement of air from within the splash chamber 40 to the fuel reservoir to which the same is attached. Within the splash chamber 40 is a fiberous material 47, preferably of a steel wool material to permit air flow therethrough but to hinder the passage of fuel therefrom.

The filtering means 24 includes an upright annular pleated main filter body 48 having opposite ends connected to upper and lower end plates 49 and 51; a cup member 53 mounted about the upper end plate 49; and a sealing ring 55 mounted against the bottom surface of the lower end plate 51 for engagement against the top surface of the attachment means 22. The filter body 48 is an interconnected, pleated structure and preferably constructed of a paper filter media impregnated with phenolic resin to permit fluid flow transversely thereof with impurities in the fluid settling upon the surface of the filter body 48. The end plates 49 and 51 are provided with central openings 57 positioned inwardly from an inner cylindrical portion of the filter body 48 so that air can move axially thereof. The cup member 53 includes a base plate 59 with integral, downwardly depending side walls 61. The base plate 59 has a central connector opening 62. The cup member 53 is adapted to be placed against the upper end plate 49 to permit fluid flow downwardly only toward the attachment means 22.

The cover means 26 is of a generally cup-shape having an upper dome wall 65 integral with cylindrical side walls 66. The dome wall 65 is provided with a central opening 67 adapted to be aligned with the central openings in the cup member 53, the filter body 48, the upper and lower end plates 49 and 51, and the openings 36 and 43 in the attachment means 22 for reasons to become obvious. The side walls 66 extend downwardly so as to completely cover the main filter body 48 on assembly.

As best shown in FIG. 2, the connecting means 28 includes an elongated shaft member 69; wing nut members 71; nut members 72; steel washers 73; a neoprene washer 74; fiber washers 76; and self-locking nuts 77. More particularly, the shaft member 69 is extended through the aligned openings 36 and 43 in the attachment means 22 whereupon the same is mounted against the lower wall of the connector section 33 by one of the nut members 72. A fiber washer 76 placed against the upper wall 32 of the attachment means 22 and clamped thereto by one of the locking nuts 77 threaded upon the shaft member 69. The sealing ring 55 and filter body 48, respectively, are placed about the shaft member 69 aligned with the axis thereof.

Next, the cup member 53 is placed about the shaft member 69 with the same extended through the connector opening 62 whereupon a fiber washer 76 is placed thereabout and against the upper surface of the cup member 53. A winged nut member 71 is threaded upon the shaft member 69 to engage the top surface of the cup member 53 so as to press the same in a clamped relationship against the attachment means 22. Next, a nut member 72 is threaded upon the shaft member 69 and a steel washer 73 and the neoprene washer 74, respectively, are placed thereabout. The cover means 26 is thereupon placed upon the shaft member 69 with the same extended through the central opening 67 and a fiber washer 76 placed against the upper surface of the cover means 26. Finally, the winged nut member 71 is placed upon the shaft member 69 to clamp the cover means 26 between same and the co-operating nut member 72 and also prevents air flow through the connector opening 67.

In another embodiment, being the covering and filtering apparatus 18, the same is substantially identical having the filtering means 24, covering means 26, and connecting means 28 except provided with an attachment means 80. As shown in FIG. 2, the attachment means 80 includes a cap member 82 provided with an end wall 84 and downwardly depending side walls 85. The end wall 84 is provided with a central connector opening 86 and a plurality of radially spaced openings 88. The side walls 85 are provided with internal threads so as to be readily attachable to an externally threaded fuel inlet stem 89. The assembly of the covering and filtering apparatus 18 is substantially identical to that previously described for the filtering apparatus 12 except that the elongated shaft member 69 is extended through the central opening 86 in the cap member 82 and secured thereto as by the nut members 72 and lock nuts 77 having the fiber washer 76 mounted against the end wall 84. It is seen that the covering and filtering apparatus 18 is operable in a substantially identical manner to the prior embodiment except having the same easily threaded to the fuel inlet stem 89 as such is readily found in fuel storage tanks and the like.

Figure 4:
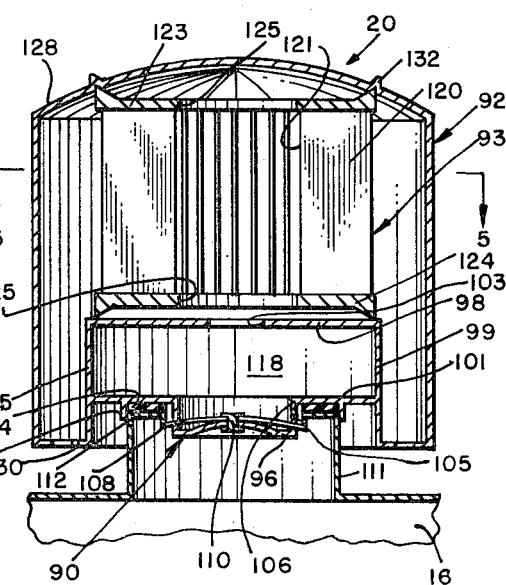
FIG. 4 is a sectional view illustrating a disposable covering and filtering apparatus of this invention.

In the disposable covering and filtering apparatus 20 as shown in FIG. 4, the same includes an attachment means 90 intergral with a cover means 92 having a filtering means 93 sandwiched therebetween. The attachment means 90 includes a main housing 95 provided with a connector section 96 integral therewith. The main housing 95 includes an upper separator wall 98 having downwardly depending side walls 99 integral with an intermediate support wall 101 which, in turn, is secured to the connector section 96. The separator wall 98 is provided with a central opening 103 therein adapted to permit air flow downwardly for movement through discharge holes 105 in the connector section 96. The connector section 96 is provided with a cylindrical portion 106 provided with a brass anchor strip 108 secured thereto as by a rivet member 110. It is seen that the anchor strip 108 is readily attachable to side walls 111 of an upright fuel tank stem 112 by a one-half to three-quarter turn rotational movement in a well known manner. The connector section 96 is also provided with a gasket member 114 mounted within a guide wall 116 engagable with the stem 112. The area between the intermediate wall 101 and the separator wall 98 forms a splash chamber 118 to prevent fuel from within the reservoir 16 from splashing upwardly to contaminate the filtering means 93. The filtering means 93 is substantially identical to that previously described having a main filter body 120 of an annular shape with upright pleated side walls defining an upright air chamber 121 therebetween. The main body 120 is provided with upper and lower end plates 123 and 124, each having an opening 125 therein.

The cover means 92 includes a cup-shaped body 128 having its lower peripheral edges integral with an entrance end wall 130 which, in turn, has its innermost peripheral surface secured to the side walls 99 of the attachment means 90. The upper surface of the body 128 is provided with an annular ring section 132 adapted to be sealed within upright pointed portions of the upper end plate 123 of the filtering means 93. The entrance end wall 130 is provided with a plurality of elongated slots 133 to permit air inlet flow upwardly towards the filtering means 93. It is also noted that the entrance end wall 130 is extended downwardly from the attachment means 90 so as to provide for the controlled movement of air thereabout so that any dirt or debris accumulating around the connector stem 112 would be blown therefrom so as to prevent contamination of the reservoir on removing the disposable covering and filtering apparatus 20. Also, it is seen that the integral construction of the cover means 92 and the attachment means 90 provides for the sandwiching of the filter means 93 therebetween so as to provide a low cost, integral, neat appearing structure.

In the use and operation of the covering and filtering apparatus 12 of this invention, it is obvious that the same may be attached to the fuel stem 14 on the fuel reservoir 16 in a twisting motion as practiced today on conventional automotive gas caps. The air moves inwardly adjacent the lower peripheral edges of the cover means 26 and upwardly and transversely of the filter body 48. The upper fiber washer 76, neoprene washer 74, and wing nut 71 prevents the air from leaving the cover means 26. Instead the air moves downwardly towards the attachment means 22 through the upper openings 38, the fibrous material 47, and the holes 42 into the reservoir 16. This is required in diesel engine operation as the use of a sealed or clogged cap would result in a collapsing or rupture of the reservoir tank 16 due to the vacuum created therein. After usage, the upper wing nut 71 may be removed as desired so as to readily reveal the filter body 48 to ascertain whether same needs to be cleansed or replaced. If the main filter body 48 is contaminated, it is seen that the other wing nut 71 may be moved from the shaft member 69 whereupon the cup member 53 is lifted therefrom so as to remove the filter body 48. It is obvious in this embodiment that there is maintained a sealed relationship about the upright shaft member 69 at all positions thereof so that air flow can only move upwardly and transversely through the main filter body for the most efficient and effective operation thereof. Additionally, the fibrous material 47 prevents fluid from within the reservoir tank 16, especially when the same is filled to capacity, from splashing upwardly to contaminate the filter body 48. Instead, the liquid hits the fibrous material 47 which stops its directional movement and momentum for downward flow through the holes 45 into the reservoir 16.

In the covering and filtering apparatus 18, it is seen that the same is operable in a manner similar to that above described but that the camp member 82 is threaded on the stem 89 in a conventional movement to provide the same efficient and effective filtering of air flow thereto and prevent collapsing and rupture of the reservoir 16.

In the disposable covering and filtering apparatus 20, it is obvious that the same is also attachable to the fuel stem 112 in a twisting movement as desired or may be constructed with the cap member 82 where the same is required. It is seen that this integral construction provides a rigid structure whereupon the entire structure is readily rotatable for attachment to a given fuel stem. Additionally, the positioning of the filter body 93 above the attachment means 90 through the splash chamber 118 is extremely important and desirable in increasing the long life and preventing contamination of the fllter body.

It is seen that the covering and filtering apparatus of this invention provides a new and novel means for preventing dirt from entering the fuel system or collecting in the air passages in the existing fuel tank caps. The covering and filtering apparatus prevents water from entering the fuel reservoir from rain or snow which is now permitted through existing fuel tank cap covers. Also, the filtering apparatus prevents a vacuum from forming in the fuel reservoir which also in turn reduces liquid condensation therein. Additionally, the covering and filtering apparatus prevents dust and impurities from collecting on the top of prior existing cap members and entering the fuel tank when the cap member is removed. It is seen that the covering and filtering apparatus of this invention would prevent expensive repairs caused from dust, moisture, and dirty fuel permitting clean air to replace the fuel being used by, for example, a diesel engine.

While the invention has been described in conjunction with preferred specific embodiment, thereof, it will be understood that this description is intended to illustrate and not to limit the scope of the invention, which is defined by the following claims.

I claim:

1. A covering and filtering apparatus for attachment to a fuel reservoir tank, comprising;
   (a) attachment means adapted to be connected to a fuel inlet stem into the fuel reservoir tank,
   (b) filtering means mounted against said attachment means in an air tight relationship, said filtering means including an upright, cylindrical pleated main filter body having upper and lower peripheral edges sealed by respective end plates to direct air flow transversely through said filter body,
   (c) cover means mounted on and about said filtering means having a lower peripheral edge adjacent and positioned downwardly of said attachment means to a position adjacent the reservoir tank when mounted on the fuel inlet stem to direct air from about said attachment means upwardly for movement transversely of said filter body and prevent collection of dust and debris about the fuel inlet stem,
   (d) said attachment means having a connector section with an upright cylindrical portion and an anchor strip secured thereto connectable to the fuel inlet stem and an enclosed tubular splash chamber housing between said connector section and said filtering means having a horizontal centrally apertured separator top wall integral with upright sidewalls secured by a support bottom wall to said connector section whereby fuel in the fuel reservoir cannot splash upon and contaminate said filter body,
   (e) said filtering means being mounted between said separator wall and the upper surface of said cover means and spaced from the side wall of cover means so as to permit air flow transversely through upright interconnected, side walls of said filter body for subsequent flow downwardly into said splash chamber and laterally into the reservoir tank, said filter body being mounted directly above said splash chamber on said separator wall,
   (f) said cover means having a cup shaped body mounted about said filter body, and
   (g) said attachment means integral with said cover means through an entrance end wall secured to said cup shaped body and said splash chamber housing bottom wall and having a plurality of spaced elongated slots therein for air flow upwardly and laterally through said filter body.

2. A covering and filtering apparatus as described in claim 1, wherein;
   (a) said separator wall having a central opening, and
   (b) said connector section having said upright cylindrical portion with a central axis perpendicular to said separator wall, said cylindrical portion having a plurality of spaced holes therein, the axis of said holes and said central opening perpendicular to each other to confine liquid movement to within said splash chamber.

References Cited

UNITED STATES PATENTS

| | | | |
|---|---|---|---|
| 2,496,883 | 2/1950 | McKalip | 220—44A |
| 3,067,908 | 12/1962 | Graham | 220—44A |
| 3,218,785 | 11/1965 | Tietz | 55—510 |
| 1,841,691 | 1/1932 | Wilson | 55—506 |
| 2,660,261 | 11/1953 | Jeffrey | 55—485 |
| 2,917,110 | 12/1959 | Brohl | 55—417 |
| 3,085,383 | 4/1963 | Garbig | 55—510 |
| 3,137,284 | 6/1964 | Hultgren | 123—119B |
| 3,165,469 | 1/1965 | Bruns et al. | 55—510 |
| 3,167,416 | 1/1965 | Humbert, Jr. et al. | 55—510 |
| 3,142,549 | 7/1964 | Klusewitz et al. | 55—417 |
| 3,277,876 | 10/1966 | Abts | 123—119B |
| 3,391,679 | 7/1968 | Williams et al. | 123—136 |

FOREIGN PATENTS

| | | | |
|---|---|---|---|
| 153,865 | 10/1953 | Australia | 55—510 |

FRANK W. LUTTER, Primary Examiner

B. NOZICK, Assistant Examiner

U.S. Cl. X.R.

55—482, 498, 502, 510; 220—44